United States Patent
Rick

[11] Patent Number: 6,000,489
[45] Date of Patent: Dec. 14, 1999

[54] ANTI-THEFT STEERING LOCK

[76] Inventor: Frank G. Rick, 114 Gilfillan St., Franklin, Pa. 16323

[21] Appl. No.: 08/931,790

[22] Filed: Sep. 16, 1997

Related U.S. Application Data

[60] Provisional application No. 60/026,165, Sep. 16, 1996.

[51] Int. Cl.⁶ .................................................. B60R 25/00
[52] U.S. Cl. ............................ 180/287; 188/265; 70/186
[58] Field of Search .................................. 188/265, 166, 188/170, 171; 70/182, 183, 184, 185, 186, 252; 180/287

[56] References Cited

U.S. PATENT DOCUMENTS

| | | | |
|---|---|---|---|
| 3,641,489 | 2/1972 | Shimomura | 180/287 |
| 4,258,819 | 3/1981 | Baptiste, Sr. | 180/287 |
| 4,300,057 | 11/1981 | Batlle Crosas | 307/10 |
| 4,318,288 | 3/1982 | Rifat | 70/252 |
| 4,463,340 | 7/1984 | Adkins et al. | 340/64 |
| 4,546,846 | 10/1985 | Myers | 180/287 |
| 4,562,710 | 1/1986 | Lipschutz | 70/252 |
| 4,581,909 | 4/1986 | Weber | 70/186 |
| 4,636,651 | 1/1987 | Kilgore | 307/10 |
| 4,719,460 | 1/1988 | Takeuchi et al. | 340/825.31 |
| 4,982,584 | 1/1991 | Takedo et al. | 70/252 |
| 5,016,454 | 5/1991 | Al-Sheikh | 70/185 |
| 5,052,509 | 10/1991 | Dzioba | 180/287 |
| 5,079,435 | 1/1992 | Tanaka | 307/10.2 |
| 5,136,284 | 8/1992 | Kitamura | 340/825.31 |
| 5,307,048 | 4/1994 | Sonders | 340/426 |

Primary Examiner—Robert J. Oberleitner
Assistant Examiner—Mariano Sy
Attorney, Agent, or Firm—Lovercheck and Lovercheck

[57] ABSTRACT

A shaft lock for an automobile with a steering column. The steering column has a gear rim thereon with teeth on its periphery and a hollow cylinder is attached to the car body. A magnetic piston is slidably received in a hydraulic cylinder having a piston rod extending from the magnetic piston to the gear rim. An electromagnet is supported on the hydraulic cylinder and adjacent to the magnetic piston so that the field from the electromagnet holds the piston rod teeth out of engagement with the teeth on the gear rim when the ignition of the motor is turned on. The motor has an oil system connected to the hydraulic cylinder to force the magnetic piston away from the gear rim when the motor has started. A helical compression spring is supported on the hydraulic cylinder which urges the magnetic piston from the gear rim and disengages the teeth on the piston rod from the teeth on the gear rim. A coded switch is connected in series with a second switch connected to the electromagnet whereby a horn operates if the engine does not start after a predetermined number of tries.

20 Claims, 3 Drawing Sheets

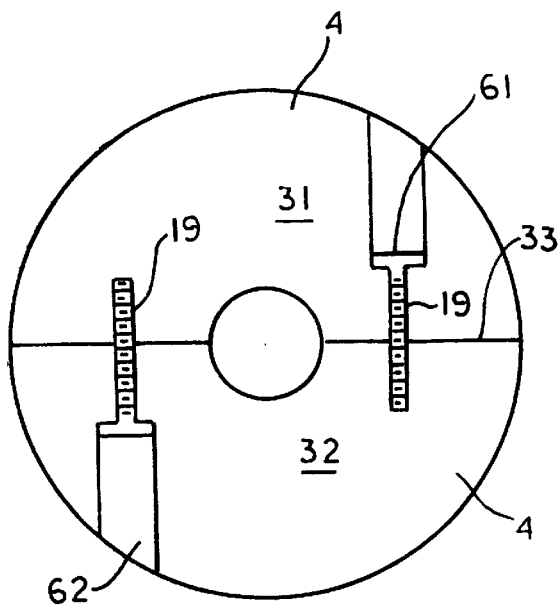
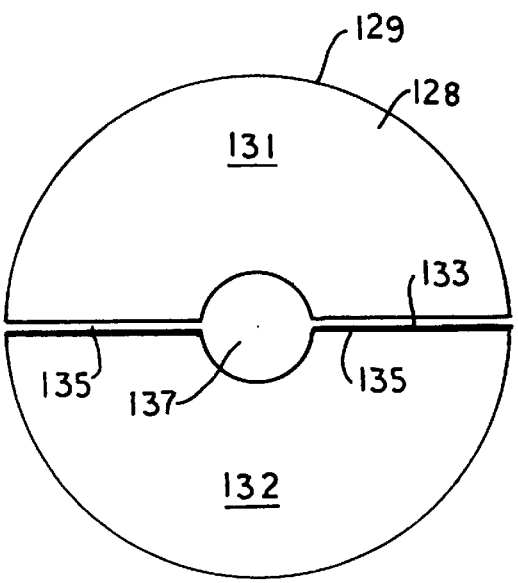
FIG. 3
FIG. 5
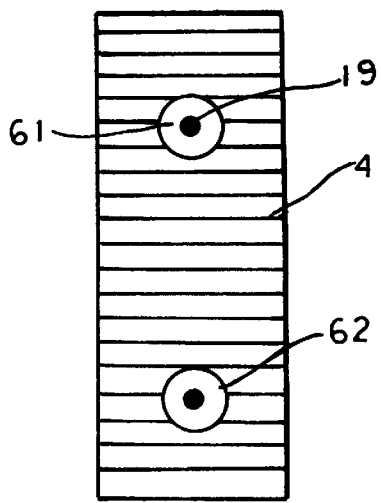
FIG. 4

ANTI-THEFT STEERING LOCK

BACKGROUND OF THE INVENTION

This application claims the benefit of U.S. Provisional Application Ser. No. 60/026,165 filed Sep. 16, 1996.

There is a need for a security device to prevent car theft. A buzzer will sound if the motor does not start after several tries.

STATEMENT OF THE INVENTION

This invention relates to a vehicle steering column lock and an air bag alarm. To start the vehicle, a code is put in the code switch, the car key is used to a activate digital combination lock which requires entry of an access code. When the motor is stopped, the steering column is locked by the plunger teeth and the rim teeth on the steering column on the drum shaft. The car key is then used in a second lock to start the motor in the usual way by turning off the lock. The rising motor oil pressure releases the steering column lock. The engine is stopped in the usual way. A horn will sound if there is tampering with starting the motor. The steering column lock can also be used to lock a drive shaft of a vehicle.

Applicant is aware of the following U.S. Pat. Nos.: 4,258,819; 4,300,057; 4,463,340; 4,546,846; 4,562,710; 4,636,651; 4,719,460; 4,982,584; 5,016,454; 5,079,435; 5,136,284; and, 5,307,048.

SUMMARY OF THE INVENTION

It is an object of the present invention to provide a steering column lock, an air bag alarm and a transmission lock that is simple in construction, economical to manufacture and simple and efficient to use.

It is another object of the present invention to provide an improved motor coil activated lock.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

BRIEF DESCRIPTION OF THE DRAWING(S)

FIG. 3 is a another embodiment of the rim disk shown in FIG. 1.

FIG. 4 is a side view of another embodiment of the rim disk.

FIG. 5 is an edge view of a rim disk shown in FIG. 2.

DESCRIPTION OF THE PREFERRED EMBODIMENT(S)

Figure 1:
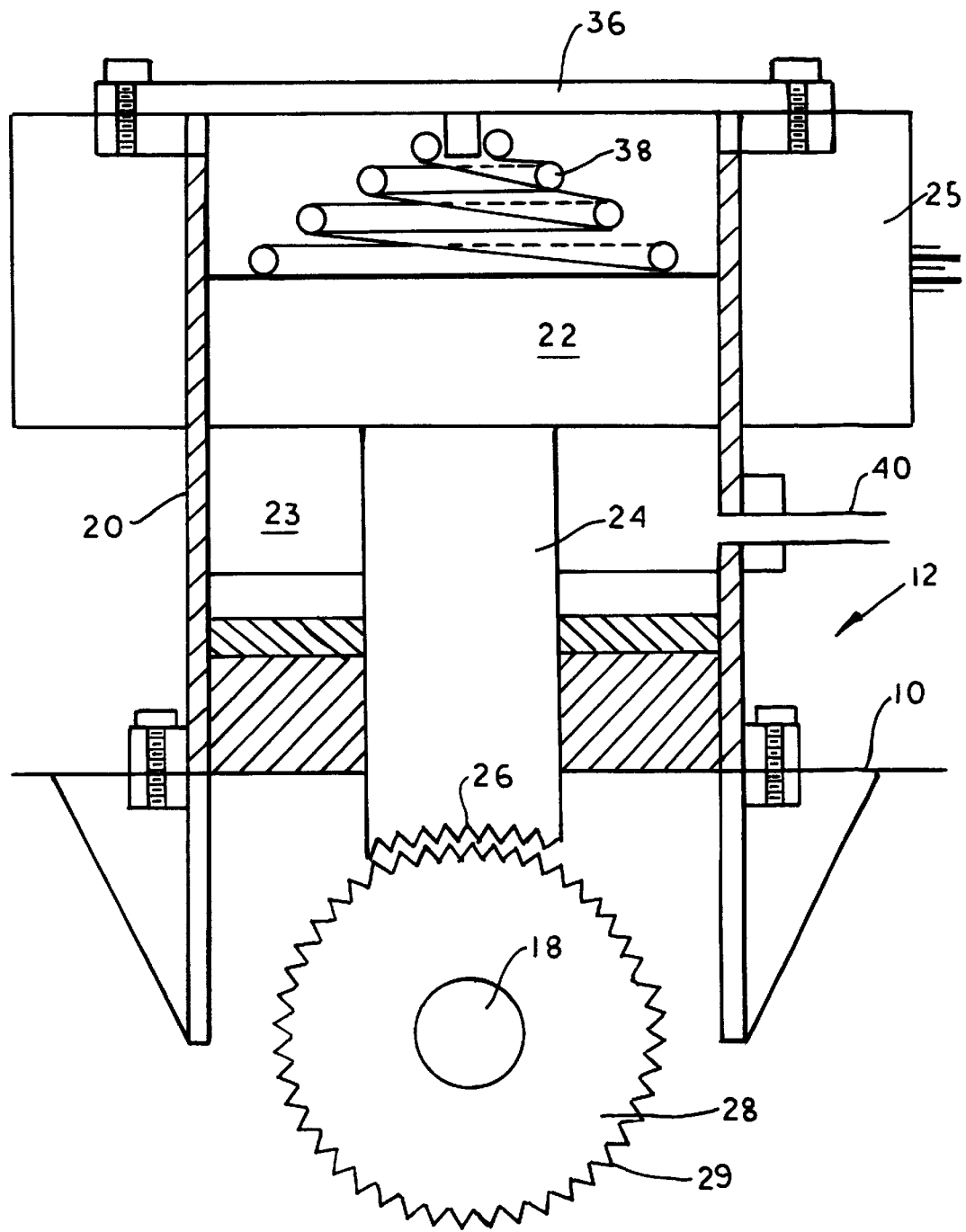
FIG. 1 is a longitudinal cross sectional view of a steering shaft and lock according to the invention.
Figure 2:
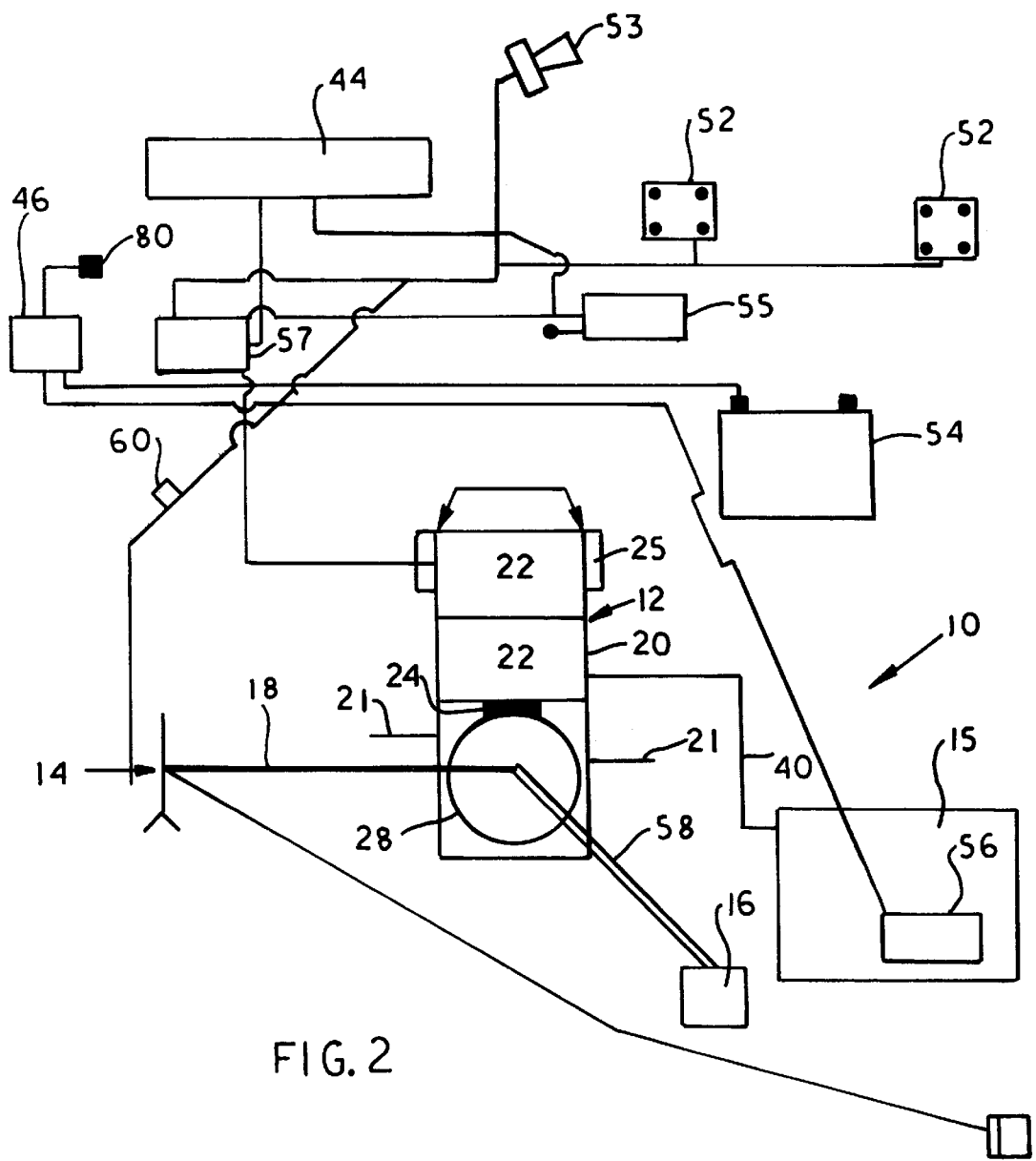
FIG. 2 is a schematic diagram of the steering column lock, alarm system and steering shaft lock circuit.

Now with more particular reference to the drawings, FIGS. 1 and 2 show steering shaft lock 12 for use on automobile 10 of the type in general use having steering wheel 14, motor 15, steering box 16 and steering shaft 18.

Steering shaft lock 12 is made up of hollow cylinder 20 that is supported on fire wall 21. Hollow cylinder 20 has magnetic piston 22. Piston rod 24 is fixed to magnetic piston 22. Piston rod 24 has lock teeth 26 on its outer end. Lock disk 28 is clamped to steering shaft 18 by bolts 19. Lock disk 28 has rim teeth 29 and is made of halves 31,32 held together by bolts 19. Helical compression spring 38 is received in hollow cylinder 20 above magnetic piston 22 and under cylinder head 36. Engine oil line 40 is connected to the engine oil system so that engine oil under pressure will enter space 23 under magnetic piston 22 when motor 15 starts.

When motor 15 is not running, helical compression spring 38 holds lock teeth 26 in contact with rim teeth 29 so steering shaft 18 is held against rotation, and automobile 10 cannot be steered. Code box switch 44 and ignition switch 46 are connected in series with each other.

Magnetic piston 22 can only be operated by means of code box switch 44 and timer switch 57, or by oil pressure from line 40. By shutting off ignition switch 46 motor 15 will stop the engine oil pressure will decrease allowing lock teeth 26 to move into engagement with rim teeth 29. If steering shaft lock switch 46 is not shut off, buzzer 80 will sound alerting the driver.

To start motor 15 a proper code is set in code box 44. Ignition switch 46 and timer switch 57 are turned on. After motor 15 is started electromagnet 25 holds lock teeth 26 out of engagement with rim teeth 29 on lock disk 28 whether motor 15 continues running or not, until timer switch 57 is turned off. Ignition switch 46 will connect power from battery 54 to starter 56 and motor 15 will then start. When motor 15 starts, the oil pressure rises in engine oil line 40 to space 23 and holds magnetic piston 22, piston rod 24 and lock teeth 26 out of engagement with rim teeth 29 on gear rim 28 and the automobile can be driven.

Steering shaft 18 is connected by steering rod 53 to steering box 16. Airbag sensors 52 are connected to timer switch 57 which is connected to ignition switch 46. Motor 15 has starter 56 connected through start switch 46 to battery 54. Battery 55 is connected through code box 44 and to electromagnet 25. Horn 53 is connected to timer switch 57 and if motor 15 does not start after a predetermined number of tries, timer switch 57 will turn on horn 53. Horn 53 will then operate. After a second predetermined time, timer switch 57 will again close and the starting procedure can be repeated. Timer switch 57 also is connected to air bag sensors 52. Battery 54 is connected through switch 46 to horn 53 and to starter 56. Battery 55 is connected through code box 44, timer switch 57 to electromagnet 25. Battery 55 is also connected to timer switch 57 to air bag sensors 52, horn 53, over ride air bag switch 60 and horn 53.

FIG. 3 shows another embodiment of the lock disk 4 having halves 31,32 which are separated along diametrical line 33 and held together by screws 19. Screws 19 have heads 61 in counterbore 62.

FIG. 4 shows a side view of lock disk 4 as shown in FIG. 3. FIG. 4 shows heads 61 of screws 19 in counter bore 62 in disk 4.

FIG. 5 shows another embodiment of lock disk 128. Lock disk 128 is divided into two equal halves 131,132 along diametrical line 133 and has rim teeth 129. Halves 131,132 are attached together by two suitable strips of adhesive 135 extending between halves 131,132 along the diametrical lines and around the inside of bore 137 that receives steering shaft 18 so that steering shaft 18 as well as halves 130,131 are held together by adhesive 135

The foregoing specification sets forth the invention in its preferred, practical forms but the structure shown is capable of modification within a range of equivalents without departing from the invention which is to be understood is broadly novel as is commensurate with the appended claims.

What is claimed is:

1. Security system for a vehicle having a motor and an operative shaft;

a hollow cylinder having a first closed end and a second closed end;

a piston slidably supported in said hollow cylinder;

said piston having a piston rod extending through said second closed end of said hollow cylinder;

a first tooth means on said piston rod;

a second tooth means on said operative shaft;

a helical compression spring in said hollow cylinder adjacent said first closed end of said end for urging said piston toward said second closed end and urging said first tooth means into engagement with said second tooth means;

an oil line from said system is connected to said hollow cylinder adjacent said first end thereof whereby oil from said vehicle motor when running exerts pressure on said piston holding said first tooth means out of engagement with said second tooth means thereby allowing said vehicle to be operative.

2. The security system recited in claim 1 wherein said piston is magnetic and magnetic means is provided on said hollow cylinder to move said magnetic piston toward said first end of said hollow cylinder whereby said first tooth means is moved out of engagement with said second tooth means.

3. The security system recited in claim 1 wherein said second tooth means comprises a circular disk having a central opening and said second tooth means being on the outer periphery of said circular disk receiving said first tooth means on said piston rod.

4. The security system recited in claim 2 wherein said circular disk is divided into two halves along a diametrical line and attaching means is provided for attaching said two halves of said circular disk together with said operative shaft therebetween.

5. The security system recited in claim 4 wherein said attaching means comprises a tape in the form of strips of adhesive material laid between said halves of said disk and around said operative shaft.

6. The security system recited in claim 4 wherein said attaching means comprises threaded screw members whereby said two halves of said disk are attached together and to said operative shaft.

7. The security system recited in claim 2 wherein said magnetic means comprises an electromagnet on said hollow cylinder and a coded switch for connecting said electromagnet to a source of electricity to hold said piston rod away from said second tooth means whereby said first tooth means on said piston rod is disengaged from said second tooth means on said operative shaft.

8. The security system recited in claim 6 wherein said motor has an electrical starter and first switch means connects said starter to a source of electricity and to said electromagnet.

9. The security system recited in claim 1 wherein a steering wheel lock switch is connected to said electromagnet by said steering wheel lock switch which connects electrical power from said electromagnet when said motor is started.

10. A lock system for a vehicle motor having an oil supply pressurized when said vehicle motor is running;

a hollow cylinder on said vehicle with a magnetic piston having piston rod teeth in said cylinder;

said vehicle having an operative shaft with gear teeth thereon;

a helical compression spring in said hollow cylinder urging said magnetic piston toward said gear teeth for engaging said piston rod teeth with said gear teeth when said motor is not running;

an engine oil supply being connected to said hollow cylinder for urging said piston rod teeth away from said operative shaft when said motor is running.

11. The system recited in claim 10 wherein an electromagnet is supported on said hollow cylinder;

a code box with a code switch therein;

said electromagnet being connected to said code box for connecting an electrical current to said electromagnet when said motor is started;

said piston rod teeth are pulled away from said operative shaft pulling said piston rod teeth out of engagement with said gear teeth on said operative shaft when starting said vehicle motor is started.

12. The system recited in claim 10 wherein said gear teeth on said operative shaft are made in two halves separated along a diametrical plane held together by radially extending screws in said gear teeth whereby said halves of said gear teeth are held together on said operative shaft.

13. In combination a vehicle having an operative shaft having a gear with teeth supported thereon and a hydraulic cylinder supported on said vehicle adjacent said operative shaft;

said hydraulic cylinder having a magnetic piston with a piston rod;

piston rod teeth on said piston rod;

a helical compression spring in said hydraulic cylinder urging said magnetic piston to move said piston rod teeth into engagement with said gear teeth for holding said operative shaft in position;

said vehicle having a pressurized motor oil supply connected to said hydraulic cylinder for urging said magnetic piston to move said piston rod teeth out of engagement with said gear teeth when said vehicle is running and an electromagnet is supported on said hydraulic cylinder;

an ignition system on said vehicle connected to said electromagnet for moving said piston rod teeth out of engagement with said gear teeth when said vehicle is running.

14. The system recited in claim 7 wherein a buzzer is connected to said ignition system and the buzzer is activated when said coded switch is activated more than a predetermined number of times.

15. The system recited in claim 13 wherein said gear teeth are divided into two parts;

a screw means holding said parts clamped together on said operative shaft.

16. The system recited in claim 11 wherein said code box is connected to said electromagnet whereby said electromagnet is disabled from moving said piston rod teeth away from said gear teeth when the code box is turned off.

17. The system recited in claim 16 wherein a buzzer is connected to an ignition switch of said vehicle whereby said buzzer goes off when said ignition switch is turned on.

18. The system recited in claim 1 wherein said operative shaft is a steering shaft.

19. The system recited in claim 1 wherein said operative shaft is a drive shaft.

20. The combination recited in claim 13 wherein said operative shaft is a steering shaft.

* * * * *